United States Patent [19]

Kimura et al.

[11] Patent Number: 5,682,269
[45] Date of Patent: Oct. 28, 1997

[54] OBJECTIVE LENS DEVICE

[75] Inventors: Kenichi Kimura, Kawasaki; Makoto Sekita, Yokohama, both of Japan

[73] Assignee: Canon Kabushiki Kaisha, Tokyo, Japan

[21] Appl. No.: 687,023

[22] Filed: Jul. 25, 1996

[30] Foreign Application Priority Data

Jul. 31, 1995 [JP] Japan .................... 7-214195

[51] Int. Cl.$^6$ .............. G02B 9/60; G02B 9/62; G02B 13/04
[52] U.S. Cl. .......... 359/770; 359/752; 359/753; 359/761
[58] Field of Search ................... 359/761, 770, 359/752, 753

[56] References Cited

U.S. PATENT DOCUMENTS

| | | | |
|---|---|---|---|
| 3,297,394 | 1/1967 | Solisch | 350/215 |
| 4,991,942 | 2/1991 | Fujibayashi et al. | 350/423 |
| 5,103,343 | 4/1992 | Sekita | 359/684 |
| 5,132,848 | 7/1992 | Nishio et al. | 359/686 |
| 5,134,524 | 7/1992 | Hamano et al. | 359/687 |
| 5,159,496 | 10/1992 | Kataoka | 359/761 |
| 5,253,113 | 10/1993 | Sekita et al. | 359/680 |
| 5,341,243 | 8/1994 | Okuyama et al. | 359/687 |

FOREIGN PATENT DOCUMENTS

| | | |
|---|---|---|
| 54-151442 | 11/1979 | Japan . |
| 55-45007 | 3/1980 | Japan . |
| 56-22406 | 3/1981 | Japan . |
| 58-40166 | 9/1983 | Japan . |
| 61-123810 | 6/1986 | Japan . |
| 63-81309 | 4/1988 | Japan . |
| 64-61714 | 3/1989 | Japan . |
| 1-214812 | 8/1989 | Japan . |

*Primary Examiner*—Scott J. Sugarman
*Attorney, Agent, or Firm*—Fitzpatrick, Cella, Harper & Scinto

[57] ABSTRACT

An objective lens device comprising in order from the lens closest to an object side, a negative meniscus first lens whose concave side faces the object side; a positive second lens; a positive meniscus third lens whose convex side faces an image side; a negative meniscus fourth lens whose concave side faces the object side; a negative meniscus fifth lens whose convex side faces the object side; and a positive sixth lens. The fifth and sixth lenses are cemented together to form a cemented lens subunit. The objective lens device contains six lenses in its entire lens structure, has a long back focus, and provides excellent optical properties over an entire field.

7 Claims, 3 Drawing Sheets

FNo/2.83
SPHERICAL ABERRATION
−0.01  0.01 w=22.6
ASTIGMATISM
−0.01  0.01 w=22.6
DISTORTION
−5.00  5.00

SPHERICAL
ABERRATION

ASTIGMATISM

DISTORTION

OBJECTIVE LENS DEVICE

BACKGROUND OF THE INVENTION

1. Field of the Invention

The present invention relates to an objective lens device with a photographic field angle of about 45 degrees and an f-number of about 2.8, and, more particularly, to a retrofocusing type objective lens device suitable for use in a small camera utilizing a solid-state image pick-up device, having a long back focus, and good optical properties over an entire field.

2. Description of the Related Art

In recent years, the production of smaller cameras such as video cameras utilizing a solid-state image pickup device has caused a demand for smaller and brighter objective lens devices. In such cameras, it is necessary to dispose various optical members, such as lowpass filters or color-correcting filters, between the rearmost portion of the lens device and image pickup device. Therefore, objective lens devices need to have a relatively long back focus. In the case of cameras utilizing a color image pickup device, it is desirable that they provide excellent telecentric properties at an image side in order to prevent color shading.

Hitherto, wide angle lens devices as objective lens devices utilizing 6 to 7 lenses in their lens structure and having a long back focus have been disclosed, for example, in Japanese Patent Laid-Open Nos. 54-151442, 55-45007, and 56-22406. Objective lens devices have also been disclosed, for example, in Japanese Patent Laid-Open No. 1-214812 and U.S. Pat. No. 3,297,394, in which aberrations are corrected by a negative meniscus lens whose convex side faces an object, or by a cemented lens subunit. These objective lens devices are designed primarily for 35-mm film cameras, so that these lens devices cannot be regarded as satisfactory objective lens devices utilizing a solid-state image pickup device because they do not have a sufficiently long back focus and sufficient telecentric properties.

Objective lens devices with a simple lens construction and having sufficiently long and satisfactory telecentric properties have been disclosed, for example, in Japanese Patent Laid-Open Nos. 64-61714, 61-123810, and 63-81309. The objective lens devices disclosed in Japanese Patent Laid-Open Nos. 64-61714 and 61-123810 are wide angle objective lens devices, and the objective lens device disclosed in Japanese Patent Laid-Open No. 63-81309 is a standard angle objective lens device. Japanese Patent Publication No. 58-40166 discloses a retrofocusing type telecentric lens system having a back focus that is longer than the focal distance.

Generally, in order for the back focus to be long, it is desirable to construct the lens system into a retrofocusing type lens system in which the front lens unit has a strong negative refractive power and the rear lens unit has a positive refractive power. However, various aberrations, such as spherical aberration, coma, distortion, astigmatism, etc. occur more frequently because the entire lens system becomes asymmetrical when it is a retrofocusing type, and the absolute value of the negative refractive power of the front lens unit must be made larger in order for the back focus to be long. This has made it extremely difficult to correct each of the various aberrations satisfactorily.

Attempting to obtain a sufficiently long back focus results in such problems as a longer overall length of the objective lens device and a larger diameter of the front lens unit.

In addition, for an objective lens device utilizing a color image pickup device, the lens units near the object side tend to be large, when an attempt is made to make the optical system into one that is telecentric at an object side. This causes nonaxial aberration to occur more often.

SUMMARY OF THE INVENTION

Accordingly, an object of the present invention is to form a suitable lens structure in order to provide an objective lens device having a back focus long enough to allow various optical members, such as a filter, to be disposed between the rear end of the lens and an imaging plane, having a smaller first focusing lens unit, being telecentric at an image side, having a photographic angle of about 45 degrees and an f-number of about 2.8, and which is corrected for various aberrations over an entire field.

To this end, the present invention provides an objective lens device which comprises in order from the lens closest to an object side, a negative meniscus first lens whose convex side faces the object side, a positive second lens, a positive meniscus third lens whose convex side faces an image side, a negative meniscus fourth lens whose convex side faces the object side, a negative meniscus fifth lens whose convex side faces the object side, and a positive sixth lens. The fifth lens and the sixth lens are cemented together, forming a cemented lens subunit.

DESCRIPTION OF THE PREFERRED EMBODIMENTS

Figures 1, 2A, 2B, 2C:
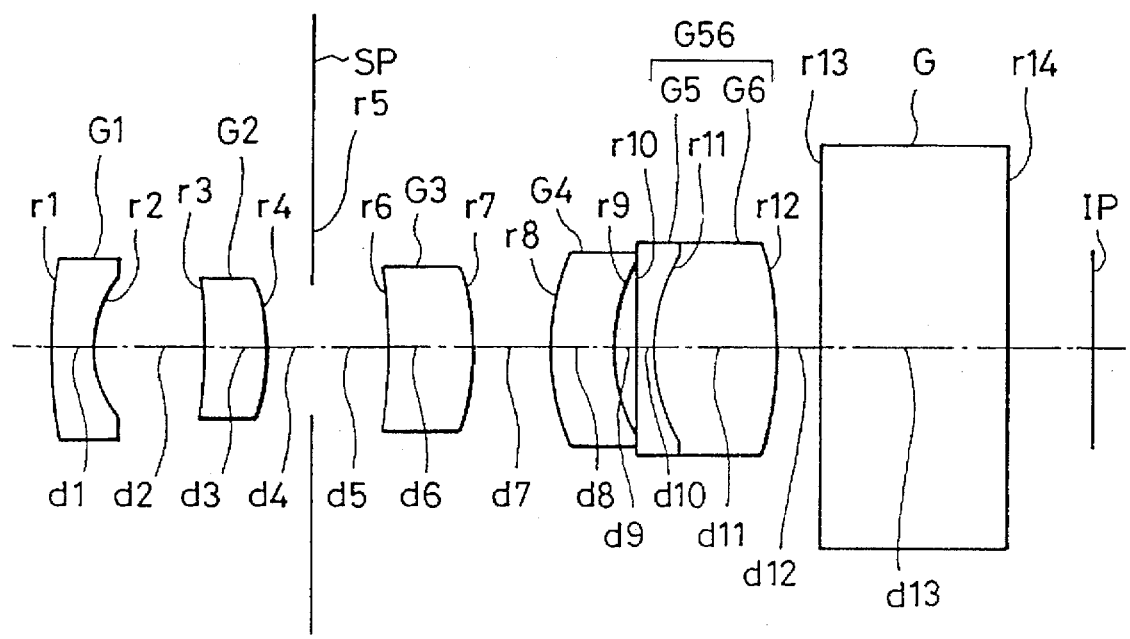
FIG. 1 is a cross sectional view of a lens device of Numerical Example 1 of the present invention.
FIGS. 2A, 2B, and 2C illustrate graphs showing the aberrations of the lens device of Numerical Example 1 of the present invention.
Figure 3:
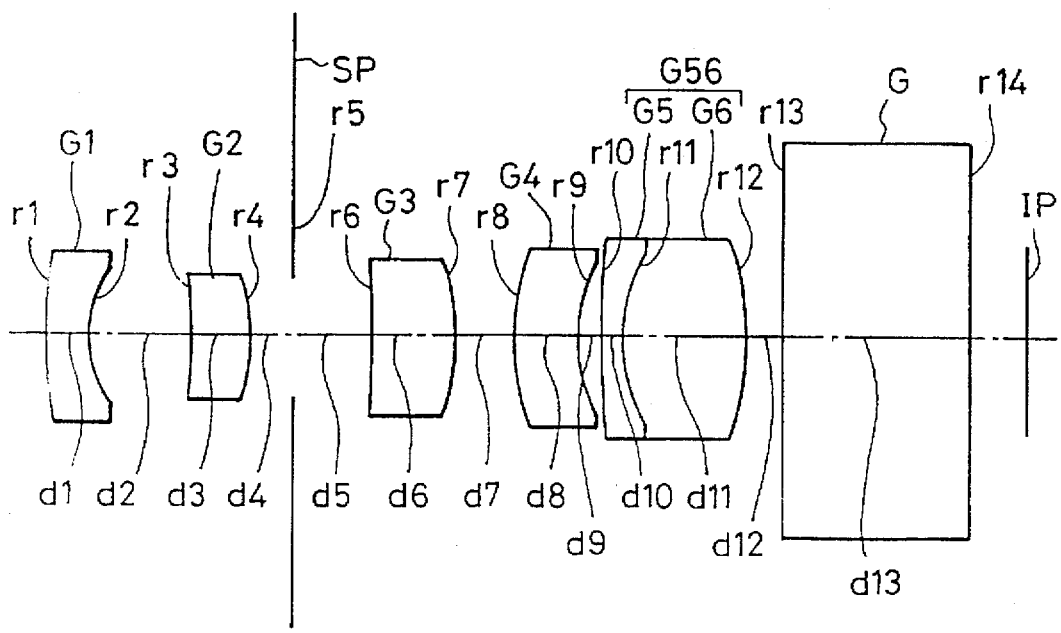
FIG. 3 is a cross sectional view of a lens device of Numerical Example 2 of the present invention.
Figure 4A:
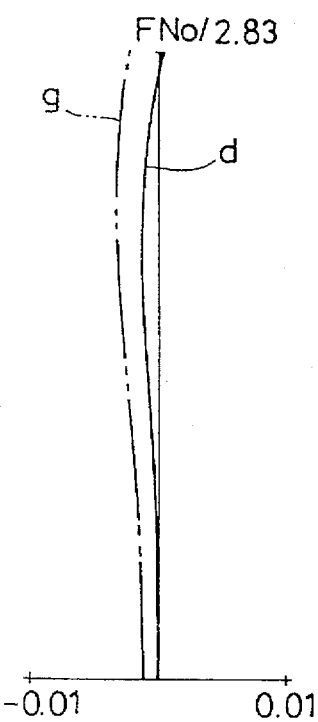
FIGS. 4A, 4B, and 4C illustrate graphs showing the aberrations of the lens device of Numerical Example 2 of the present invention.
Figure 4B:
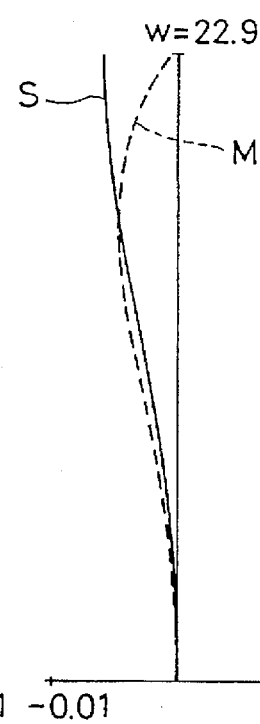
Figure 4C:
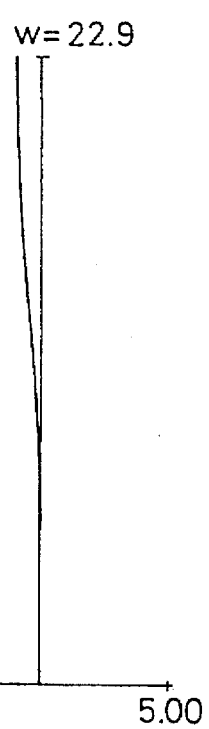
Figure 5:
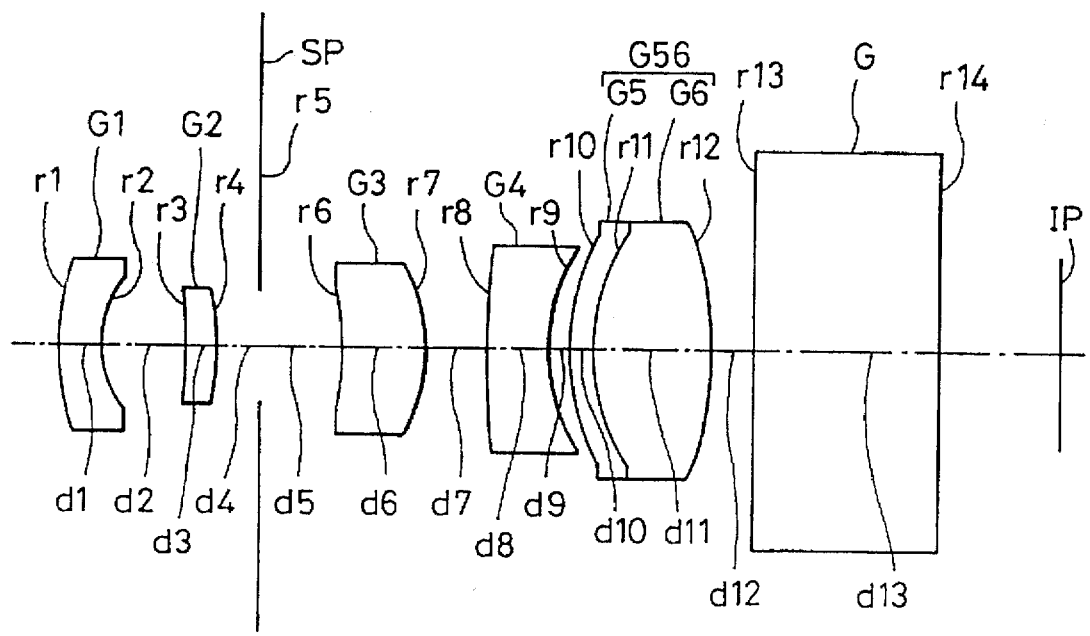
FIG. 5 is a cross sectional view of a lens device of Numerical Example 3 of the present invention.
Figures 6A, 6B, 6C:
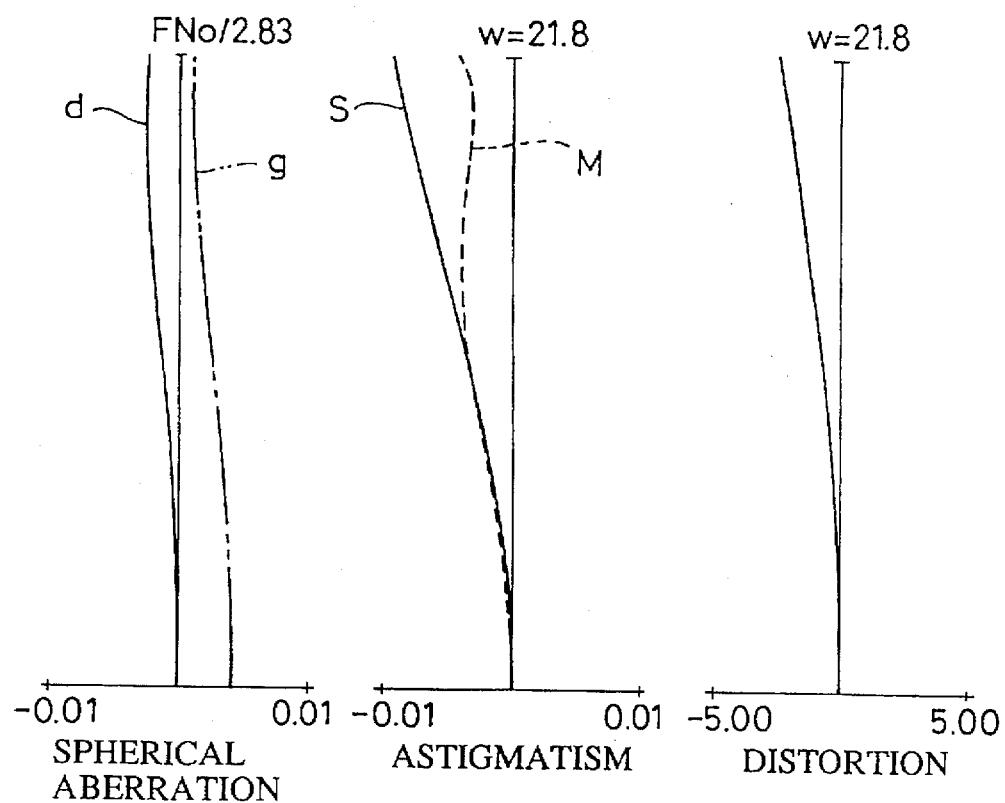
FIGS. 6A, 6B, and 6C illustrate graphs of the aberrations of the lens device of Numerical Example 3 of the present invention.

FIG. 1 is a cross sectional view of a lens device of Numerical Example 1 of the present invention, while FIGS. 2A, 2B, and 2C illustrate graphs of the aberrations of the lens device of Numerical Example 1 when an object is at infinity. FIG. 3 is a cross sectional view of a lens device of Numerical Example 2 of the present invention, while FIGS. 4A, 4B, and 4C illustrate graphs of the aberrations of the lens device of Numerical Example 2 when the object is at infinity. FIG. 5 is a cross sectional view of a lens device of Numerical Example 3 of the present invention, while FIGS. 6A, 6B, and 6C illustrate graphs showing the aberrations of the lens device of Numerical Example 3 when the object is at infinity.

According to the present invention, the objective lens device comprises six lenses. They are, in order from the lens closest to an object side, a negative meniscus first lens G1, a positive second lens G2, a positive meniscus third lens G3 whose convex side faces an image side, a negative meniscus fourth lens G4 whose convex side faces the object side, a negative meniscus fifth lens G5 whose convex side faces the object side, and a positive biconvex sixth lens G6. The fifth lens G5 and the sixth lens G6 are cemented together to form a cemented lens subunit G56. A stop SP is disposed between the second lens G2 and the third lens G3. In the figures, G denotes a glass block such as a face plate or an optical filter, and IP denotes an image plane.

The objective lens device of the present embodiment is formed by two retrofocusing lens units, one composed of the negative first lens G1 and the positive second lens G2, and the other composed of the negative third lens G3, the negative fourth lens G4, and the cemented lens subunit G56. By virtue of such a construction, the back focus can be made sufficiently long such that the principal point at the image side is positioned closer to the image side.

Here, the lens system is considered as being formed by two lens units, a front lens unit composed of the first lens G1 and the second lens G2, and a rear lens unit composed of the third to sixth lenses G3 to G6. The front lens unit is a substantially afocal system which consists of negative first lens G1 and positive second lens G2. The air gap between the first lens G1 and the second lens G2 can be reduced by setting the refractive powers of the negative first lens G1 and the positive second lens G2 at high values, with the afocal magnification maintained, which leads to reduction of the diameter of the first lens G1. When the refractive powers are set at high values, the high refractive power of the second lens G2 causes a large astigmatism. The astigmatism of the second lens G2 is corrected by the negative fourth meniscus lens G4 whose convex side faces the object side. Comatic aberration of the first lens G1 and that of the second lens G2 are also corrected by the fourth lens G4. Oblique aberration is corrected by the cemented lens subunit formed by cementing the fifth lens G5 and the sixth lens G6 and having the convex side facing the object side.

In the present embodiment, by virtue of the above-described lens structure, the objective lens device contains relatively few lenses, aberrations are properly corrected over the entire field, and the objective lens device is particularly suitable for a photographic system utilizing a solid-state image pickup device, has a relatively long back focus, and is telecentric at the image side.

In the present embodiment, the objective lens device has long back focus and good optical properties from its particular shape.

It is to be noted that in order for the back focus to be easily set to a predetermined value, for oblique aberrations, such as distortion, to be properly corrected, and for the optical properties over the entire field to be satisfactorily corrected, only at least one of the following conditions need to be satisfied.

$$(1\text{-}1) \quad -7 < \frac{R9 + R8}{R9 - R8} < -1 \tag{1}$$

where R8 and R9 represent the radius of curvature of the surface at the object side and that at the image side of the fourth lens, respectively.

Condition 1 is related to the shape of the negative meniscus fourth lens G4. When the ratio is less than the lower limit and the meniscus fourth lens G4 is more curved, not only are astigmatism and coma corrected excessively, but also higher-order aberration occurs. On the other hand, when the value exceeds the upper limit and the fourth lens G4 becomes a plano-convex lens, the fourth lens G4 no longer is effective in correcting astigmatism and coma. Therefore, it is not preferable that the ratio be less than the lower limit or be greater than the upper limit.

$$(1\text{-}2) \quad N1 < N2 \tag{2}$$

where N1 and N2 denote, respectively, the refractive indices of the materials of the first lens and the second lens, with the second lens being a meniscus-shaped lens whose convex side faces an image side.

Coma occurring at the surface at the image side of the first lens G1 is corrected by the second lens G2 which is formed into a meniscus lens whose convex side faces an image side. It corrects coma along with the fourth lens G4 which is also formed into a meniscus lens.

Condition 2 is related to the refractive indices of the materials of the first lens G1 and the second lens G2. In common retrofocusing type lens systems, the Petzval's sum tends to be too small. But in the lens structure of the present invention, the Petzval's sum tends to be positively large. The Petzval's sum is a proper value when the material of the second lens G2 has a higher refractive index than the first lens G1. When N1 becomes greater than N2, and the refractive index of the material of the first lens G1 becomes high, the Petzval's sum increases in the positive direction, thus increasing the curvature of field. Therefore, it is not desirable that N1 be greater than N2.

$$(1\text{-}3) \quad 0.1 < D3/R4 < 0.3 \tag{3}$$

where D3 represents the thickness of the second lens, and R4 denotes the radius of curvature of the lens surface at the image side of the second lens.

Condition 3 is related to the thickness (of the center) of the second lens G2. When the second lens G2 is of the proper thickness, distortion that occurs in the negative first lens G1 is corrected. When the value is less than the lower limit, and the second lens G2 is thinner, it becomes difficult to produce the lens because the edge thickness becomes smaller. In addition, when the value becomes less than the lower limit of Condition 3, and the curvature of the lens surface at the image side is low, distortion is not sufficiently corrected. On the other hand, when the value is greater than the upper limit, and the second lens G2 is thicker, the size of the lens system becomes larger. In addition, when the value exceeds the upper limit of Condition 3, and the curvature of the lens surface at the image side becomes too large, not only is distortion corrected in excess, but also higher order aberration occurs. Therefore, it is not preferable that the value be greater than the upper limit or be less than the lower limit.

(1-4) When an object at infinity is in focus, and a nearby object is to be brought into focus, the entire lens system or the third to sixth lenses are integrally moved toward the object side.

In changing the focusing object from an object at infinity to a nearby object by an objective lens device in the present embodiment, good optical properties are provided by moving the entire lens system to an object side. The first lens G1 and the second lens G2 are as a whole substantially afocal, so that focusing is performed by integrally moving the lens unit composed of the third lens G3 to the sixth lens G6, whereby variations in aberration that occur during focusing are properly corrected. The lens unit has a focusing sensitivity of about 1.

(1-5) Either light control means used by an iris stop, or light control means by switching various apertures, or light control means with a fixed aperture is disposed between the second lens and the third lens, or between the third lens and the fourth lens.

An iris stop, or a so-called turret-type stop used by switching various apertures, or a fixed aperture type stop is disposed in front of or behind the third lens G3 in order to facilitate exposure control, without any shading, and to obtain good optical properties over the entire field. When a color image-pickup device is used as the image pickup means, it is desirable that the lens system be telecentric at the image side. This is achieved by disposing a stop, as mentioned above, as a result of which aberrations are properly corrected.

(1-6) $3 < |tk/f|$                           (4)

where tk denotes the position of the exit pupil of the system, measured from the sixth lens surface at the image plane side, and f denotes the focal length of the entire lens system.

Condition 4 is related to the position of the exit pupil of the lens system, measured from the surface of the last lens in the objective lens device. When the tk/f ratio is less than the lower limit of Condition 4 and the exit pupil is closer to the lens system, color shading or the like occurs in a camera using a color image pickup device. Therefore, it is not preferable that the tk/f ratio be less than the lower limit.

Numerical examples of the present invention will now be described. In the numerical examples, Ri denotes the radius of curvature of a surface of an i-th lens surface in order of lenses from the lens closest to an object side, Di denotes the thickness of an i-th lens in order of lenses from the lens closest to the object side and air gap, and Ni and Vi denote, respectively, the refractive index and the Abbe constant of a glass of an i-th lens in order of lenses from the lens closest to the object side. R13 and R14 each represent the radius of curvature of a surface of a glass block, such as a face plate or an optical filter. The relationships between each of the above-described conditions and the numerical values of the numerical examples are given below in Table 1.

(Numerical Example 1)
F = 5.75   FNo = 1:2.83   2ω = 45.3

| | | | |
|---|---|---|---|
| R1 = | 14.30 | D1 = 1.00 | N1 = 1.60311 | υ1 = 60.7 |
| R2 = | 2.91 | D2 = 2.54 | | |
| R3 = | −22.50 | D3 = 1.50 | N2 = 1.69680 | υ2 = 55.5 |
| R4 = | −5.32 | D4 = 1.05 | | |
| R5 = | (stop) | D5 = 1.86 | | |
| R6 = | −14.51 | D6 = 2.00 | N3 = 1.69680 | υ3 = 55.5 |
| R7 = | −6.60 | D7 = 1.82 | | |
| R8 = | 6.10 | D8 = 1.50 | N4 = 1.84666 | υ4 = 23.8 |
| R9 = | 4.36 | D9 = 0.51 | | |
| R10 = | 37.44 | D10 = 0.50 | N5 = 1.84666 | υ5 = 23.8 |
| R11 = | 4.81 | D11 = 3.00 | N6 = 1.77250 | υ6 = 49.6 |
| R12 = | −8.07 | D12 = 1.00 | | |
| R13 = | ∞ | D13 = 4.50 | N7 = 1.51633 | υ7 = 64.2 |
| R14 = | ∞ | | | |

(Numerical Example 2)
F = 5.68   FNo = 1:2.83   2ω = 45.8

| | | | |
|---|---|---|---|
| R1 = | 14.52 | D1 = 1.00 | N1 = 1.60311 | υ1 = 60.7 |
| R2 = | 3.00 | D2 = 2.45 | | |
| R3 = | −27.67 | D3 = 1.50 | N2 = 1.69680 | υ2 = 55.5 |
| R4 = | −5.48 | D4 = 1.00 | | |
| R5 = | (stop) | D5 = 2.00 | | |
| R6 = | −17.96 | D6 = 2.00 | N3 = 1.69680 | υ3 = 55.5 |
| R7 = | −6.64 | D7 = 1.49 | | |
| R8 = | 6.57 | D8 = 1.50 | N4 = 1.84666 | υ4 = 23.8 |
| R9 = | 4.44 | D9 = 0.58 | | |
| R10 = | 20.92 | D10 = 0.50 | N5 = 1.84666 | υ5 = 23.8 |
| R11 = | 4.55 | D11 = 3.00 | N6 = 1.77250 | υ6 = 49.6 |
| R12 = | −9.07 | D12 = 1.00 | | |
| R13 = | ∞ | D13 = 4.50 | N7 = 1.51633 | υ7 = 64.2 |
| R14 = | ∞ | | | |

(Numerical Example 3)
F = 6.00   FNo = 1:2.83   2ω = 43.6

| | | | |
|---|---|---|---|
| R1 = | 7.74 | D1 = 1.00 | N1 = 1.60311 | υ1 = 60.7 |
| R2 = | 2.93 | D2 = 1.99 | | |
| R3 = | −21.25 | D3 = 0.80 | N2 = 1.69680 | υ2 = 55.5 |
| R4 = | −6.08 | D4 = 1.00 | | |
| R5 = | (stop) | D5 = 2.00 | | |
| R6 = | −8.13 | D6 = 2.00 | N3 = 1.69680 | υ3 = 55.5 |
| R7 = | −5.18 | D7 = 1.48 | | |
| R8 = | 20.64 | D8 = 1.50 | N4 = 1.84666 | υ4 = 23.8 |
| R9 = | 5.23 | D9 = 0.50 | | |
| R10 = | 7.09 | D10 = 0.50 | N5 = 1.84666 | υ5 = 23.8 |
| R11 = | 5.53 | D11 = 3.00 | N6 = 1.77250 | υ6 = 49.6 |
| R12 = | −8.36 | D12 = 1.00 | | |
| R13 = | ∞ | D13 = 4.50 | N7 = 1.51633 | υ7 = 64.2 |
| R14 = | ∞ | | | |

TABLE 1

| | | Numerical Example | | |
|---|---|---|---|---|
| | Formula | 1 | 2 | 3 |
| (1) | $\frac{R9 + R8}{R9 - R8}$ | −6.03 | −5.16 | −1.68 |
| (2) | N1 | 1.603 | 1.603 | 1.603 |
| | N2 | 1.697 | 1.697 | 1.697 |
| (3) | \|D3/R4\| | 0.28 | 0.27 | 0.13 |
| (4) | \|tk/f\| | 3.88 | 3.70 | 12.13 |

As can be understood from the foregoing description, according to the present invention, a proper lens structure makes it possible to provide an objective lens device having a back focus that is long enough to allow various optical members, such as a filter, to be disposed between the objective lens device and an imaging plane, having a smaller front lens unit diameter, having telecentric properties at an image side, having a photographic field angle of about 45 degrees, having an f-number of about 2.8, and excellent optical properties, with the various aberrations corrected over the entire field.

What is claimed is:

1. An objective lens device comprising in order from the lens closest to an object side:

a negative meniscus first lens whose convex side faces the object side;

a positive second lens;

a positive meniscus third lens whose convex side faces an image side;

a negative meniscus fourth lens whose convex side faces the object side;

a negative meniscus fifth lens whose convex side faces the object side; and a positive sixth lens;

wherein said fifth lens and said sixth lens are cemented together to form a cemented lens subunit.

2. An objective lens device according to claim 1, satisfying the condition $$-7 < \frac{R9 + R8}{R9 - R8} < -1,$$

wherein R8 and R9 represent the radius of curvature of a surface at the object side of said fourth lens and the radius of curvature of a surface at the image side of said fourth lens, respectively.

3. An objective lens device according to claim 1, further satisfying the condition N1<N2, wherein N1 and N2 denote the refractive indices of the materials of said first lens and said second lens, respectively, with said second lens being a meniscus lens whose convex side faces the image side.

4. An objective lens device according to claim 1, further satisfying the condition 0.1<|D3/R4|<0.3, wherein D3 represents the thickness of said second lens, and R4 represents the radius of curvature of a surface at the image side of said second lens.

5. An objective lens device according to claim 1, wherein when an object at infinity is in focus and a nearby object is to be brought into focus, an entire lens system is moved, or said third lens to sixth lens are integrally moved toward the object side.

6. An objective lens device according to any one of claims 1 to 5, further comprising one of light control means including an iris stop, light control means including switching of a plurality of apertures, and light control means with a fixed aperture, said light control means being disposed between said second lens and third lens, or between said third lens and said fourth lens.

7. An objective lens device according to claim 1, further satisfying the condition 3<|tk/f|, wherein tk represents the position of an exit pupil of the lens system, measured from a surface at the image side of said sixth lens, and wherein f represents a focal length of the entire lens system.

* * * * *